US006742179B2

(12) United States Patent
Megiddo et al.

(10) Patent No.: US 6,742,179 B2
(45) Date of Patent: May 25, 2004

(54) RESTRUCTURING OF EXECUTABLE COMPUTER CODE AND LARGE DATA SETS

(75) Inventors: Nimrod Megiddo, Palo Alto, CA (US); Bilha Mendelson, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 09/902,595

(22) Filed: Jul. 12, 2001

(65) Prior Publication Data

US 2003/0014741 A1 Jan. 16, 2003

(51) Int. Cl.⁷ .............................. G06F 9/44; G06F 9/45
(52) U.S. Cl. ........................................ 717/130; 717/151
(58) Field of Search ............................. 717/124–133, 717/151–161; 714/37–39; 712/216, 244

(56) References Cited

U.S. PATENT DOCUMENTS

| 5,579,520 | A | | 11/1996 | Bennett ...................... 717/151 |
| 5,613,118 | A | | 3/1997 | Heisch et al. ............... 717/158 |
| 5,901,308 | A | | 5/1999 | Cohn et al. ................. 712/244 |
| 5,950,009 | A | | 9/1999 | Bortnikov et al. .......... 717/158 |
| 6,000,044 | A | * | 12/1999 | Chrysos et al. .............. 714/47 |
| 6,070,009 | A | * | 5/2000 | Dean et al. ................. 717/130 |
| 6,092,180 | A | * | 7/2000 | Anderson et al. ........... 717/159 |
| 6,148,396 | A | * | 11/2000 | Chrysos et al. .............. 714/47 |
| 6,164,841 | A | * | 12/2000 | Mattson et al. ................ 716/1 |
| 6,189,141 | B1 | * | 2/2001 | Benitez et al. .............. 717/153 |
| 6,195,748 | B1 | * | 2/2001 | Chrysos et al. .............. 714/38 |
| 6,374,367 | B1 | * | 4/2002 | Dean et al. ................... 714/37 |
| 6,549,930 | B1 | * | 4/2003 | Chrysos et al. ............. 709/104 |

OTHER PUBLICATIONS

Cohn et al. Hot Cold Optimization of Large Windows/NT Applications. IEEE. 1996. pp. 80–89.*
Merten et al. A Hardware Driven Profiling Shceme for Identifying Program Hot Spots to Support Runtime Optimization. IEEE. 1996. pp. 136–147.*
Randall R. Heisch, "FDPR for AIX Executables", *AIXpert Back to Contents*, Aug. 1994.
R.R. Heisch, "Trace–directed program restructuring for AIX executables", IBM J. Res. Develop., vol. 38, No. 5, Sep. 1994.
Itai Nahshon and David Bernstein, "FDPR–A Post–pass Object–code Optimization Tool", pp. 1–8.
Ealan A. Henis et al., "Feedback Based Post–link Optimization for Large Subsystems", pp. 1–8.

* cited by examiner

Primary Examiner—Wei Y. Zhen
(74) Attorney, Agent, or Firm—Charles W. Peterson, Jr.; Marc D. McSwain

(57) ABSTRACT

A program product and method of compiling a computer program to optimize performance of a computer program. First, after initialization, a profiling run is done on computer code which may include program code blocks and program data. Execution of each computer program step is monitored and each occurrence of each individual code unit is logged, e.g. each instruction block or block of data. Frequently occurring code units are identified periodically as hot blocks. An initial snapshot of hot blocks is logged, e.g., when identified hot blocks exceed an initial block number. Profiling continues until the profiling run is complete, updating identified hot blocks and logging a new current snapshot whenever a current set of identified hot blocks contains a selected percentage of different hot blocks. Snapshots are selected as representative to different program modes. The program is optimized according to program modes.

30 Claims, 1 Drawing Sheet

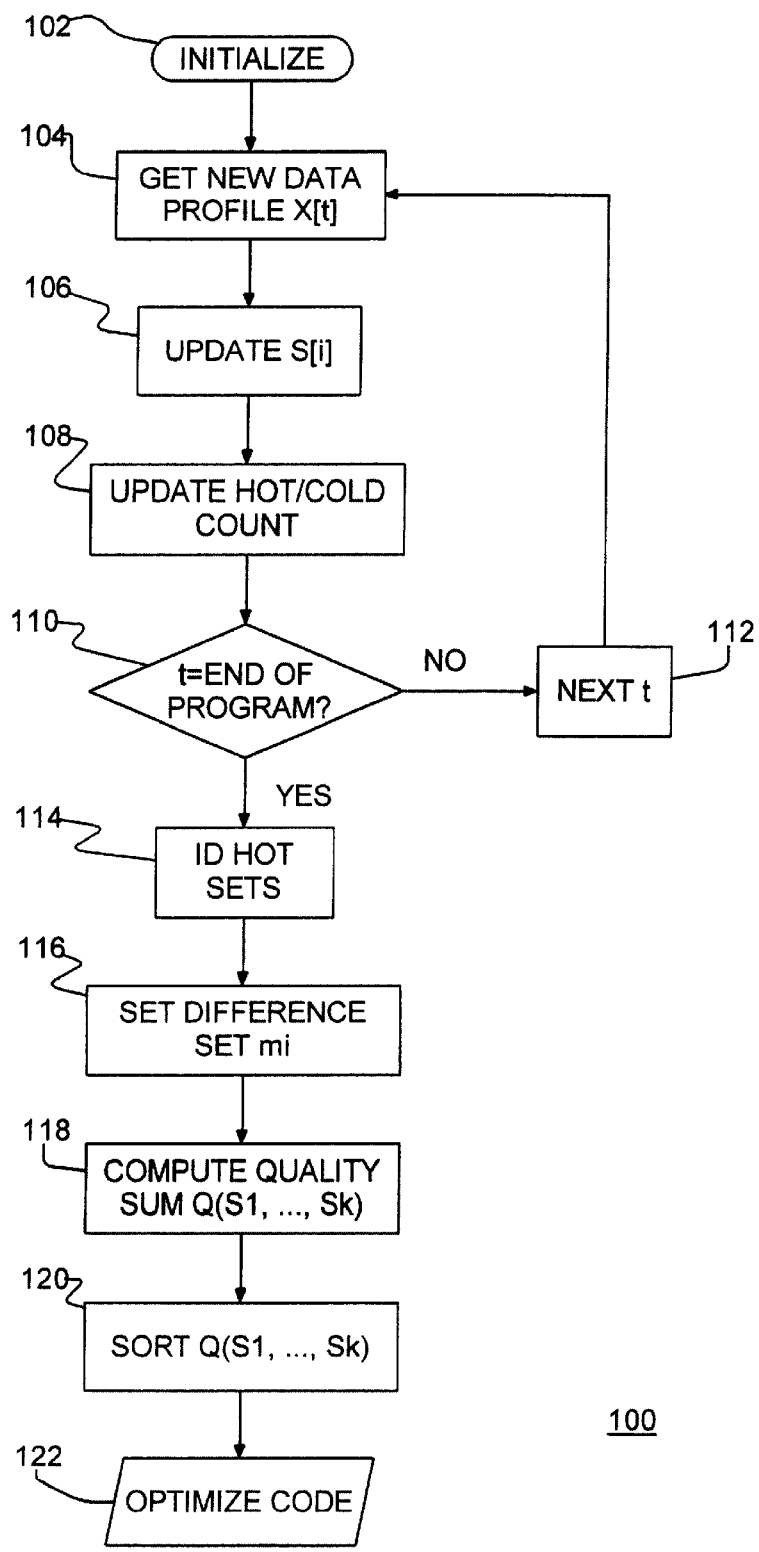
FIGURE

RESTRUCTURING OF EXECUTABLE COMPUTER CODE AND LARGE DATA SETS

BACKGROUND OF THE INVENTION

1. Field of the Invention

The present invention generally relates to optimization of computer programs and more particularly, the present invention relates to ordering portions of a computer program and data used therein for improved execution order.

2. Background Description

A typical state of the art computer, whether a large mainframe computer or small personal computer (PC), includes a hierarchical memory system. The memory system may include nonvolatile storage, main memory and cache memory. Non-volatile storage, typically is disk storage or a hard disk. Main memory is typically relatively low cost, dense dynamic random access memory (DRAM). Usually cache memory is faster, more expensive, less dense static random access memory (SRAM). Typically, cache memory is a small portion of the entire memory system, e.g., 1–10%.

Memory paging systems are designed to exploit spatial and temporal locality. Temporal locality refers to the tendency of programs to execute instructions repeatedly; thus the performance of fetching instructions from main memory can be improved by saving recently executed instructions in a small high-speed cache. Instructions are said to exhibit good spatial locality in a program if execution of an instruction tends to be followed quickly by execution of instructions packaged nearby. A program with poor spatial locality will cause unneeded instructions to be fetched into the cache, preventing cache operation at its full potential. For these hierarchical memory systems, volatile memory may be thought of as a medium-speed cache for low-speed persistent memory, such as a disk. Recently used pages are kept in memory to take advantage of temporal locality. Again, good spatial locality is required to avoid bringing unneeded instructions and data into memory. Poor spatial locality thus reduces the efficiency of memory paging.

Further, processor performance is increasing much more rapidly than the performance of their attached memory subsystems. So, it is increasingly difficult to feed data and instructions to processors rapidly enough to keep the processors utilized to their maximum capacity. As a result, a great deal of ingenuity has been expended on hardware solutions to improve the access time and memory reference throughput, including caches, prefetch buffers, branch prediction hardware, memory module interleaving, very wide buses, and so forth. Also, software may be optimized to take the best possible advantage of these hardware advances.

Unfortunately, "naive" code generation often results in programs that have poorer spatial locality than is achievable. It is typical, for example, to generate code that branches around infrequently executed error paths. This results in poor utilization of the instruction cache, since some of the error path code will usually be fetched into the cache along with the branch that bypasses it. It is also typical for computational procedures to be packaged without consideration for locality, so that although procedure A frequently calls procedure B, A and B are located in different memory pages. Accordingly, it is becoming more common to use profiling information (profiling) to analyze program behavior during execution.

Optimization procedures have been developed to optimize program code selecting segments that are most likely to be used. Those selected code segments are typically stored in cache memory. Also, large data sets may be used by a program which itself fits in cache, but the large data sets may be so large as to not fit completely into a cache memory. Program execution from each of these examples can be improved by more efficient segment caching.

With the introduction of instruction caches, which have been designed to exploit temporal and spatial locality, profiling focus was shifted to reordering code at a finer granularity. Most successful approaches to improving instruction cache performance have used profile data to predict branch outcomes. In contrast to most of the foregoing work on virtual memory performance, these techniques were implemented within the framework of optimizing compilers. Profiling gathers data about the frequencies with which different execution paths in a program are traversed. These profile data can then be fed back into the compiler to guide optimization of the code. One of the proven uses of profile data is in determining the order in which instructions should be packaged. By discovering the "hot traces" through a procedure, the optimizer can pack the instructions in those traces consecutively into cache lines, resulting in greater cache utilization and fewer cache misses. Similarly, profile data can help determine which procedures call other procedures most frequently, permitting the called procedures to be reordered in memory to reduce page faults. Thus, profile information has been used to reduce conflict misses in set-associative caches, for example. Also a reduction in conflict misses has been achieved using only static analysis of the program. Further, basic blocks have been traced to reduce the number of unexecuted instructions brought into the instruction cache (cache pollution), and to order basic blocks. It also is known that infrequently executed traces can be separated entirely from the main procedure body for additional efficiency. Other methods of reordering instructions are based on the presence of loops, branch points, and join points in the control flow graph, as well as based directly on the control dependence graph.

Thus, it is a goal of a good cache management procedure to take advantage of locality properties. Ideally, blocks of instructions or data that are expected to be used together are stored together within the cache memory. Program slow downs occur when code currently being executed by the computer need code that is outside of the cache or, even worse, outside of main memory, stored in non-volatile storage, e.g. on disk. This can happen for example with a branch or a call or when the calculation being done on data in a database that may be partially stored in cache requires data from that database that is not stored in the cache. Each branch to code out of the cache and, even more so, to code out of the main memory slows execution.

Accordingly, optimizing compilers have been developed which convert source code into object code and to what is hoped to be an optimum instruction order such that execution is maintained within code in cache at the particular point in time. These optimizing compilers typically attempt to group code into manageable groups that are compartmentalized or contained within a reasonably sized segment such that the segment may be maintained in cache memory while it is being executed.

However, the cache optimization program cannot improve the code itself, i.e., if blocks of instructions are not organized such that related blocks are in close execution proximity to each other, the cache optimization program cannot guess which blocks are more likely to be executed and what is the optimum execution order. R. R. Heisch in "FDPR for AIX Executables," AIXpert, No. 4 (August 1994), pp. 16–20 and "Trace-Directed Program Restructuring for AIX Executables," IBM Journal of Research and Development 38, No. 5, 595–603 (September 1994) teaches that instruction cache performance can be maximized by considering it as a whole-program optimization. Heisch's methods differ from previous approaches by operating as a post-processor on executable program objects and by allowing basic blocks to migrate without being constrained by procedure boundaries. The reordered code was appended to the original executable program objects, resulting in reported growth in executable file size of between 5 and 41 percent. This growth had negligible impact on performance. I. Nahshon and D. Bernstein, "FDPR-A Post-Pass Object Code Optimization Tool," Proceedings of the Poster Session of CC '96—International Conference on Compiler Construction, Sweden (April 1996), pp. 97–104 produced an improved algorithm that required less code growth. A FDPR (feedback-directed program restructuring) tool by IBM Corporation embodies the teachings of Heisch and Nahshon et al. W. J. Schmidt, R. R. Roediger, C. S. Mestad, B. Mendelson, I. Shavit-Lottem and V. Bortnikov-Sitnitsky, "Profile-directed restructuring of operating system code", IBM Systems Journal, Vol. 37, No. 2, teach a profiling system for restructuring the code, based on observed frequencies of calls to basic blocks and the usage of particular branches within the code. Such systems collect execution statistics, run on typical applications, count the number of times each basic block (B) is executed and, optionally, the number of times each sibling block (B1, B2, ...) is expected to execute after B, where B1, B2 . . . are all the possible successors of B according to the code. Blocks that are executed substantially more often than others are considered "hot" and their positions within the code are then revised with respect to the profile information, so that the restructured code is expected to run more efficiently on typical applications. Similarly, data sets can be restructured with respect to affinities that are induced by execution patterns, so that blocks of data that tend to be executed closely together, are placed in proximity to each other.

Unfortunately, a typical application may be running in several different modes and, therefore, a "hot" block may be dependent on the mode. For example, an application may have two modes of execution, an equation solving mode and a simulation mode. Naturally, blocks that are related to equation solving are hot when the system is solving an equation, while those related to simulation are hot while the system is in its simulation mode. However, deriving global block statistics may result in deeming that none of the blocks are hot since, on the average, none is used significantly more often than any other. Thus, even though programmers may have designed the source code in a way that promotes locality of these two modes, significant portions of the code, very likely are placed in a structure that does not take advantage of this modality and the instruction cache.

Thus, there is a need for a method of organizing programs for optimal block placement under all operating conditions.

SUMMARY OF THE INVENTION

The present invention is a program product and method of compiling a computer program to optimize performance of a computer program. First, after initialization, a profiling run is done on computer code which may include program code blocks and data in a database. Execution of each computer program step is monitored and each occurrence of each individual code unit is logged, e.g. each instruction block or block of data. Frequently occurring code units are identified periodically as hot blocks. An initial snapshot of hot blocks is logged, e.g., when identified hot blocks exceed an initial block number. Profiling continues until the profiling run is complete, updating identified hot blocks and logging a new current snapshot whenever a current set of identified hot blocks contains a selected percentage of different hot blocks. Snapshots are selected as representative to different program modes. The program is optimized according to program modes.

BRIEF DESCRIPTION OF THE DRAWINGS

The foregoing and other objects, aspects and advantages will be better understood from the following detailed preferred embodiment description with reference to the drawings, in which:

The sole FIGURE shows an example of steps in profiling a program according to the preferred embodiment of the present invention.

DESCRIPTION OF PREFERRED EMBODIMENTS

The present invention is a method of profiling code to identify a small number of modes of execution and restructuring the code and/or data sets to be suitable for running in the different modes.

A single path of a program can be described as a sequence of basic blocks $X[1], X[2], \ldots, X[t], \ldots, X[m]$ where $X[t]$ is the block which is executed in current time position t in the sequence of M blocks. An enumeration of all the distinct basic blocks of the executable may be represented as $B1, B2, \ldots, Bt, \ldots Bm$. $N[i,t]$ may denote the number of idices $k<=t$ such that $X[k]=Bi$, i.e., $N[i,t]$ is the number of times the block Bi was executed prior to t. The ratio $F[i,t]=N[i,t]/t$ gives the observed average frequency of that block prior to t. Similarly, $N[i,j,t]$ denotes the number of indices $k<=t$ such that $X[k]=Bi$, and $X[k+1]=Bj$, i.e., $N[k,j,t]$ is the number of times the block Bj was executed immediately after Bi prior to t. The ratio $F[i,j,t]=N[i,j,t]/t$ gives the observed average frequency of that transition prior to t. For simplicity, discussion is limited herein to single block statistics.

Prior art profiling tools did not update the value of $N[i,t]$ at each time step. Rather, at time t, the blocks $Bi=X[t]$ were checked and only the corresponding counter $N[i,t]$ was incremented for active blocks. By contrast, the present invention increases the locality and affinity of restructured code. Instead of incrementing counters $N[i,t]$ or updating the average frequencies $F[i,t]$, the profiling program of the present invention maintains block current activity values, $S[i]=a^{(t-T[i])}S[i]+(1-a)$, which are smoothed quantities representative of the frequency with which each unit of code or individual block is presently occurring as described hereinbelow.

The sole FIGURE shows the steps in method 100 of profiling a program according to the preferred embodiment of the present invention. The method 100 begins in step 102, initializing variables for all basic blocks (bbs) in the program, i.e. setting $S[i]=0$ and all time variables to zero. Then, the program begins profiling in step 104, wherein new profile data for block $X[t]$ is captured at each execution time period t, for that specific execution time. Then, in step 106 S[i] is updated, i.e., $S[i]=a^{(t-T[i])}S[i]+(1-a)$, where $T[i]$ is a current time tick count and a is a program smoothing constant small enough and adaptively determined for the specific program being profiled. In step 108, individual counts are updated for each basic block, wherein some hot blocks occurring less frequently become cold, other cold blocks increasing in frequency become hot. Thus, if S[i] is greater than the hot threshold, u, then Bi is identified as a hot bb. If, however, S[i] falls below the cold threshold, v, then Bi is recharacterized as a cold bb. Typically, u=v. Concurrently, if the hot count blocks are significantly different than the most recent snapshot, a new snapshot is taken. In step 110, a check is made to determine if profiling is complete and, if not, then in step 112 the time is set for the next period and returning to step 104 the next execution period is examined. If, however, the end of the program has been reached, then, in step 114 the hot building block sets H1, . . . , Hn are identified. In step 116 the difference m[i] is set: m [i]={|S1-Hi|, . . . , |Sk-Hi|}, where k equals the difference countable period and represents the significance correlation of knowledge within time frame of a countable period. In step 118 the quality sum Q(S1, . . . , Sk) is computed, where Q(S1, . . . , Sk)=m[1]+. . . +m[n]. The quality sum represents the quality weight of the set of building blocks. Then, in step 120 the quality sums are sorted according to value and in step 122 the program is optimized according to the quality sums, Q(S1, . . . , Sk).

Initially, in step 102 S[i]=0 and all the blocks are considered cold. As each block Bi is executed, a corresponding time is stored in a variable T[i], where initially T[i]=0. A positive number a<1, chosen with respect to the specifics of the executable is used for updating the value of S[i] when X[t]=Bi. A profiling run of the program is made beginning in step 104 while monitoring the individual smoothing quantity values. During the profiling run both S[i] and T[i]=t are updated continuously in step 106 and 112.

The preferred embodiment profiling program or profiler monitors the behavior of the individual smoothing quantities S[i], in step 108 recognizing that changes in smoothing quantities indicate shifts in the frequency with which a corresponding block occurs. Once an S[i] quantity reaches a predetermined threshold, u, indicating that the corresponding block Bi is occurring more frequently, block Bi is declared hot. Eventually, a set of blocks become hot. As profiling continues hot blocks that fall below a preselected lower threshold v<u are occurring less frequently and so, are declared cold again. The profiling system records snapshots of the set of hot blocks whenever the set size changes by a selected percentage over the last snapshot. For example, a first snapshot may be taken when the size of the hot set reaches 5% of the entire set of blocks. A new snapshot may be taken each time the difference between the current hot set and the current snapshot exceeds 5% of the entire set, i.e., new hot blocks plus newly cold blocks is 5% of the set. These snapshots are recorded, and snapshot records maintained for further historical analysis.

After the profiled execution of the instrumented code, the historical log of snapshots is analyzed in order to identify a small number of typical hot sets. The number of typical hot sets that are identified depends upon the size of the original code and the maximum possible size of the restructured code. For example, the ratio of the maximum acceptable program size to the size of the original program may be selected as the number. Given a selected goal for the number of typical hot sets, actual sets can be identified to optimally select hot set snapshots from those collected and logged by the profiling system.

Then, the selected family of hot sets, S1, . . . , Sk are determined according to a measure of quality as defined below. First, in step 114 the hot set sequence collected by the profiler is identified as H1, . . . , Hn. For each hot set (Hi), in step 116 the smallest size of a set difference m[i]=min {|S1-Hi |, . . . |Sk-Hi |} is identified. In step 118 the sum Q(S1, . . . , Sk)=m[1]+. . . +m[n] provides the quality measurement that is used to identify a good family of k hot sets, where k is typically a small number, much smaller than n, the number of hot set candidates. Then, in steps 120, 122 for each selected hot set, the executable is restructured to reflect the hot basic blocks based on their membership in the set. So, for example, if there are two hot sets selected, two restructured executables are produced. Alternately, if the two hot sets overlap, a more compact code can be generated.

When the restructured code is run, which hot set is best suited for the current mode of operation must be identified. One solution is to obey locality throughout the instruction cache. Optionally, the code may also be lightly instrumented to collect run statistics that would identify any more frequently used blocks occurring in recent passes, so as to choose dynamically the closer hot set from the chosen family of sets.

Thus, the present invention provides code that has been optimized to take advantage of locality properties. Blocks of instructions or data that are expected to be used together are stored together. Program slow downs are avoided since the code is optimized around hot sets, each of which is directed to a particular mode of operation. Similarly, datasets are restructured with respect to affinities induced by execution patterns. Thus, blocks of instructions and blocks of data are closely placed in storage to according to the likelihood of their execution order, i.e. temporal and spatial proximity.

While the invention has been described in terms of preferred embodiments, those skilled in the art will recognize that the invention can be practiced with modification within the spirit and scope of the appended claims.

What is claimed is:

1. A method of compiling a computer program to optimize performance of said compiled computer program, said method comprising the steps of:
   a) initializing a profiling run of computer code to be optimized;
   b) monitoring execution of each step of said computer program and logging each occurrence of each individual code unit;
   c) identifying a plurality of code units as hot blocks;
   d) logging a snapshot of hot blocks when identified hot blocks exceeds an initial number selected;
   e) updating identified hot blocks;
   f) logging a new current snapshot whenever a current set of identified hot blocks contains a selected percentage of hot blocks different than hot blocks contained in a most recent snapshot;
   g) repeating steps e)–f) until execution of said program being profiled is complete; and
   h) selecting a plurality of snapshots corresponding to program modes, said program being optimized according to said program modes.

2. A method as in claim 1 wherein the step a) of initializing the profiling run comprises the steps of:
   i) initializing a current time tick count; and
   ii) initializing a block activity value for said each individual code unit.

3. A method as in claim 2 wherein hot blocks are individual code units having a block activity value above a threshold value, block activity values being updated during each step.

4. A method as in claim 3 wherein the block activity values are defined by the relationship:
   $S[i]=a^{(t-T[i])}S[i]+(1-a)$, wherein T[i] is a current time tick count, t is the current time and a is a program smoothing constant.

5. A method as in claim 4 wherein step c) of identifying a plurality of code units as hot blocks comprises sequentially executing said computer program code being optimized until a threshold number of individual units are identified as hot blocks.

6. A method as in claim 5 wherein the step d) of logging a snapshot of hot blocks comprises listing hot blocks having a block current activity value above a hot threshold, u.

7. A method as in claim 6 wherein the step e) of updating identified hot blocks comprises:
   i) executing said computer program code being optimized; and at each new time tick
   ii) updating a block current activity value corresponding to a current individual code unit, whenever a corresponding block current activity for said current individual code unit exceeds said hot threshold value u said current individual code unit being identified as a hot block and, whenever any block current activity value for a corresponding hot block falls below a cold threshold value v, said corresponding hot block being identified as a cold block.

8. A method as in claim 7 wherein the step h) of selecting a plurality of snapshots corresponding program modes comprises:
   i) identifying a difference set for each individual code unit;
   ii) computing a quality sum representative of quality weight of a set of basic blocks;
   iii) sorting sets of quality sums; and
   iv) arranging code according to said sorted quality sums.

9. A method as in claim 8 wherein differences m[i] in the difference set satisfy the relationship: m[i]={|S1−Hi|, . . . , |Sk−Hi|}, wherein Hi is a hot block set and k is the difference countable period.

10. A method as in claim 9, wherein the quality sum Q(S1, . . . , Sk) is the sum of all differences m[i] in the difference set.

11. A method as in claim 10, the step (h) further comprising:
   v) combining modes having overlapping hot sets.

12. A method as in claim 10 wherein individual code units are individual instruction blocks.

13. A method as in claim 10 wherein said individual code units are blocks of program data.

14. A method of optimizing program data to improve performance of a computer program using said program data, said method comprising the steps of:
   a) initializing a profiling run of computer code to use program data being optimized;
   b) monitoring execution of each step of said computer program and logging each occurrence of each individual program data unit;
   c) identifying a plurality of program data units as hot blocks;
   d) logging a snapshot of hot blocks when identified hot blocks exceeds an initial number selected;
   e) updating identified hot blocks;
   f) logging a new current snapshot whenever a current set of identified hot blocks contains a selected percentage of hot blocks different than hot blocks contained in a most recent snapshot;
   g) repeating steps e)–f) until execution of said program using said program data being optimized is complete; and
   h) selecting a plurality of snapshots corresponding to program modes, said program data being used according to said program modes.

15. A method as in claim 14 wherein the step a) of initializing the profiling run comprises the steps of:

viii) initializing a current time tick count; and
   ii) initializing a block activity value for said each individual code unit.

16. A method as in claim 15 wherein hot blocks are program data units having a block activity value above a threshold value, block activity values being updated during each step.

17. A method as in claim 16 wherein the block activity values are defined by the relationship:
   $S[i]=a^{(t-T[i])}S[i]+(1-a)$, wherein T[i] is a current time tick count, t is the current time and a is a program smoothing constant.

18. A method as in claim 17 wherein step c) of identifying a plurality of program data units as hot blocks comprises sequentially executing said computer program until a threshold number of individual program data units are identified as hot blocks.

19. A method as in claim 18 wherein the step d) of logging a snapshot of hot blocks comprises listing hot blocks having a block current activity value above a hot threshold, u.

20. A method as in claim 19 wherein the step e) of updating identified hot blocks comprises:
   i) executing said computer program code; and at each new time tick
   ii) updating a block current activity value corresponding to a current program data unit, whenever a corresponding block current activity for said current program data unit exceeds said hot threshold value u said current program data unit being identified as a hot block and, whenever any block current activity value for a corresponding hot block falls below a cold threshold value v, said corresponding hot block being identified as a cold block.

21. A method as in claim 20 wherein the step h) of selecting a plurality of snapshots corresponding to program modes comprises:
   i) identifying a difference set for each program data unit;
   ii) computing a quality sum representative of quality weight of a set of basic blocks;
   iii) sorting sets of quality sums; and
   iv) arranging said program data according to said sorted quality sums.

22. A method as in claim 21 wherein differences m[i] in the difference set satisfy the relationship: m[i]={|S1−Hi|, . . . , |Sk−Hi|}, wherein Hi is a hot block set and k is the difference countable period.

23. A method as in claim 22, wherein the quality sum Q(S1, . . . , Sk) is the sum of all differences m[i] in the difference set.

24. A method as in claim 23, the step (h) further comprising:
   v) combining modes having overlapping hot sets.

25. A computer program product for optimizing performance of a computer program, said computer program product comprising a computer usable medium having computer readable program code thereon, said computer readable program code comprising:
   computer readable program code means for initializing profiling run variables of computer code to be optimized;
   computer readable program code means for monitoring execution of each step of said computer program profile run and logging each occurrence of each individual code unit;
   computer readable program code means for identifying code units as current hot blocks;
   computer readable program code means for logging hot block snapshots when identified hot blocks exceed an initial number selected and further logging a new current snapshot whenever a current set of identified hot blocks contains a selected percentage of hot blocks different than hot blocks contained in a most recent snapshot; and computer readable program code means for selecting a plurality of snapshots corresponding to program modes, said program being optimized according to said program modes.

26. A computer program product as in claim 25 wherein the computer readable program code means for initializing the profiling run variables comprises:

computer readable program code means for initializing a current time tick count and a block activity value for said each individual code unit.

27. A computer program product as in claim 26 wherein the computer readable program code means for identifying code units as hot block identifies individual code units having a block activity value above a threshold value as hot blocks.

28. A computer program product as in claim 27 wherein the computer readable program code means for identifying code units as hot blocks further comprises:

computer readable program code means for determining block activity according to $S[i]=a^{(t-T[i])}S[i]+(1-a)$, wherein $Ti$ is a current time tick count, $t$ is the current time and $a$ is a program smoothing constant.

29. A computer program product as claimed in claim 28 wherein the computer readable program code means for selecting a plurality of snapshots corresponding program modes comprises:

computer readable program code means for identifying a difference set for each individual code unit;

computer readable program code means for computing a quality sum representative of quality weight of a set of basic blocks;

computer readable program code means for sorting sets of quality sums; and computer readable program code means for arranging code according to said sorted quality sums.

30. A computer program product as in claim 29 wherein computer readable program code means for differences in $m[i]$ comprises:

computer readable program code means for determining $m[i]=\{|S1-Hi|, \ldots, |Sk-Hi|\}$, wherein $Hi$ is a hot block set and $k$ is the difference countable period.

* * * * *